3,102,106
STABILIZED POLYOXYMETHYLENES
John Francis Regan, Wilmington, Del., assignor to E. I. du Pont de Nemours and Company, Wilmington, Del., a corporation of Delaware
No Drawing. Filed Dec. 8, 1960, Ser. No. 74,484
6 Claims. (Cl. 260—45.9)

This invention provides high molecular weight polyoxymethylene stabilized to prevent the evolution of formaldehyde gas, and, more particularly, it provides high molecular weight polyoxymethylenes modified with certain aminosulfones as odor stabilizers.

High molecular weight polyoxymethylenes, those having a number average molecular weight of at least 15,000, have sufficiently good physical properties, such as toughness, stiffness, and tensile strength, to be classed as plastics which may be molded, extruded, or spun into very useful articles. In many applications, the minute quantities of monomeric formaldehyde which may be evolved from the polymer during prolonged period of use have no undesirable effects on the physical properties of the material. In most cases, the odor of the evolved formaldehyde gas is undetectable, however, in certain applications, as in the case where polyoxymethylene is employed in a closed container, minute amounts of formaldehyde gas may be objectionable.

It is an object of this invention to provide polyoxymethylene compositions stabilized against the evolution of formaldehyde gas by the presence of certain aminosulfones. Another object of this invention is to provide a composition stabilized against the evolution of formaldehyde gas which will develop no objectionable color. Other objects will appear in the more detailed explanation of this invention which follows.

The above objects are accomplished by providing a high molecular weight polyoxymethylene having a number average molecular weight of at least 15,000, and containing 0.1% to 5% by weight of an aminosulfone having the formula

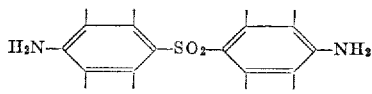

wherein each of the carbon atoms in the 2, 3, 5, and 6 positions on each ring structure is bonded to a member of the group consisting of hydrogen, alkyl groups of 1 to 10 carbon atoms, aryl groups of 6 to 10 carbon atoms, alkoxy groups of 1 to 10 carbon atoms, phenoxy, carbonyl groups of 1 to 6 carbon atoms, halogen, amino, nitrile, and combinations thereof.

Many amines cause undesirable color formation when employed with polyoxymethylene, however, the aminophenylsulfones of the present invention produce little noticeable color change when employed in the resin, and, for that reason, are superior to other types of previously known formaldehyde scavengers. In addition, the additives of the present invention produce no adverse effect upon the thermal stability of the polyoxymethylene. One of the best stabilizers, and the preferred one, indicated by the above formula is paraaminophenylsulfone.

The thermal stability of polyoxymethylene has been reported in certain other instances as a reaction rate constant for terminal degradation at 222° C. ($K_{222}$) in units of percent by weight of the polymer which degrades per minute at 222° C. In U.S. Patent 2,768,994, issued to R. N. MacDonald on October 30, 1956, certain polyoxymethylenes are claimed which have a $K_{222}$ of less than about 1% by weight per minute. In the following examples, the thermal stability of polyoxymethylene is reported as "Gas Index" (GI). The numerical value of GI is 3.7 times the milliliters of gas evolved per gram of polymer for 15 minutes elapsed time at 231° C. The GI of the polymeric sample is determined by heating a weighed sample in the form of molding powder or other melt composited material is determined by heating in a hypodermic syringe at 231° C. and observing the position of the syringe plunger at 5 and 20 minutes after the beginning of the test. The reaction rate constant for thermal degradation as described in the above-mentioned patent when multiplied by 5400 will roughly correspond to the GI value of the given sample, thus the value of the $K_{222}$ of 0.01% is approximately equal to a GI of 54.

The following examples are intended to illustrate and not to restrict the present invention. Parts and percentages are based on weight unless otherwise noted.

EXAMPLE I

A powdery high molecular polyoxymethylene diacetate having a number average molecular weight of about 40,000 was employed in the amounts indicated in Table I along with the indicated amount of a polyamide as a thermal stabilizer and a phenol [4,4'-butylidene bis(3-methyl 6-tertiary butyl phenol)] as an antioxidant. The indicated amount of bis(4-aminophenylsulfone) was also added to the polymer by the following procedure. The additives were mixed with the base polymer by dry-blending. The blend was then extruded in a 1½ inch extruder manufactured by the National Rubber Company using a temperature at the entrance of the barrel of approximately 215° C. which gradually decreased to the discharge end of the barrel to 190° C. A ⅜ inch valve die was attached to the extruder and heated to a temperature of about 190° C. The die was adjusted so that a melt pressure of about 500 p.s.i. was obtained at a screw speed of 40 r.p.m. The temperature of the extrudate was about 188° C. A rod ⅛ inch in diameter was obtained which was subsequently cooled and cut into small pieces in a standard slicing or bead cutting machine. The various samples of molding powder thus produced were measured for thermal stability and placed in a clean, 4-ounce bottle which was sealed for a period of 3 days whereupon the closure of the bottle was removed and the contents were sniffed to determine the presence of formaldehyde gas. The least detectable odor level of formaldehyde gas is reported as 0.8 part per million, and the gas becomes irritating at 5.0 parts per million. ("Formaldehyde," by J. F. Walker, Reinhold Publishing Corporation, New York, 1953, 2nd edition, page 81). The bottle was then resealed and sampled at the end of one week and at the end of one month. The presence or absence of formaldehyde gas is noted in Table I along with the semi-quantative concentration of the gas which remained constant at the initial level during the sampling period.

It can be seen from Table I that in the case where the polyoxymethylene has a polyamide stabilizer therein, the threshold odor level appears at approximately 1.6 parts of bis(4-aminophenylsulfone) corresponding to about 0.2 percent by weight. About 0.8 part of the same stabilizer are required where no polyamide stabilizer is present. The latter loading corresponds to 0.1 percent by weight. All samples containing the polyamide stabilizer exhibited very satisfactory thermal stability with the numerical values of gas index falling in the range from about 3.9 to 6.9.

Table I

| Sample | COMPOSITION | | | | Odor Level— 3 Days |
|---|---|---|---|---|---|
| | Polymer | Anti-Oxidant (Parts) | Thermal Stabilizer (Parts) | Paraaminophenyl Sulfone, as Odor Suppressor | |
| 1 | 800 | 1.6 | 4.0 | | Noticeable. |
| 2 | 800 | 1.6 | 4.0 | 4.0 | None. |
| 3 | 800 | 1.6 | 4.0 | 3.2 | None. |
| 4 | 800 | 1.6 | 4.0 | 2.4 | None. |
| 5 | 800 | 1.6 | 4.0 | 1.6 | Slight. |
| 6 | 800 | 1.6 | 4.0 | 0.8 | Noticeable. |
| 7 | 800 | 0.8 | 4.0 | 4.0 | None. |
| 8 | 800 | 1.6 | 4.0 | 0.4 | Noticeable. |
| 9 | 800 | 1.6 | | 1.6 | None. |
| 10 | 800 | 1.6 | | 0.8 | Slight. |
| 11 | 800 | 1.6 | | 0.4 | Noticeable. |

The polymer employed in this invention is a polyoxymethylene having a number average molecular weight of at least 15,000. There are several varieties of polyoxymethylene which are distinguishable by the groups which terminate the polymer chain of recurring (—$CH_2$—O—) units. For example, there are polyoxymethylene glycols in which the terminating groups are hydroxyl; polyoxymethylene dicarboxylates in which the terminating groups are esters, such as acetate and propionate; and polyoxymethylene diethers in which the terminating groups are alkyl or aryl groups joined to the polymer chain by an ether oxygen. The principal differences between any two of these types of polyoxymethylenes are in the thermal stability and hydrolytic stability, polyoxymethylene diether being more stable to hydrolysis and about the same or better in thermal stability than polyoxymethylene dicarboxylate, while the latter is better in both respects than polyoxymethylene glycol. One skilled in the art should recognize that monomers, other than formaldehyde, e.g. trioxane, may be employed to produce the polyoxymethylene, and those polymers are included within the generic term as are blends containing a major amount of polyoxymethylene and copolymers in which the dominant portions of the polymer chain comprise oxymethylene chains. Each of these varieties of the polyoxymethylene is intended to be included in the scope of this invention under the generic term "polyoxymethylene."

Polyoxymethylenes are made by polymerizing formaldehyde in the presence of any group of polymerization initiators, e.g. aliphatic amines; tertiary amino-nitrogen polymers, trihydrocarbon phosphines, arsines or stibines; organometallic compounds, metal carbonyls, quaternary ammonium or phosphonium salts, and tertiary sulfonium salts. These processes are described and claimed in U.S. Patent 2,734,889, issued on February 14, 1956, to F. C. Starr, Jr.; U.S. Patent 2,768,994, issued on October 30, 1956, to R. N. MacDonald; U.S. Patent 2,828,286, issued on March 25, 1958, to R. N. MacDonald; U.S. Patent 2,844,561, issued on July 22, 1958, to M. F. Bechtold et al.; U.S. Patent 2,848,437, issued on August 19, 1958, to W. P. Langsdorf et al.; U.S. Patent 2,841,57°, issued on July 1, 1958, to R. N. MacDonald, and in copending application Serial No. 785,135, filed on January 6, 1959, now U.S. Patent No. 2,994,687, by H. H. Goodman et al.

Polyoxymethylene dicarboxylates may be prepared by the processes described and claimed in copending applications Serial No. 681,188, filed August 30, 1957, by S. Dal Nogare et al., now U.S. Patent No. 2,998,409, and Serial No. 763,842, filed September 29, 1958, by S. H. Jenkins et al., now U.S. Patent No. 2,964,500. Polyoxymethylene diether may be prepared by the processes described and claimed in copending applications Serial No. 682,325, filed by N. Brown et al. on September 6, 1957, and Serial No. 785,136, filed by N. Brown et al. on January 6, 1959.

The odor suppressors which may be used in this invention are the sulfones having the general formula:

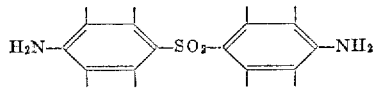

wherein each of the carbon atoms in the 2, 3, 5, and 6 positions on each ring structure is bonded to a member of the group selected from the class consisting of hydrogen, alkyl groups of 1–10 carbon atoms, aryl groups of 6–10 carbon atoms, alkoxy groups of 1–10 carbon atoms, phenoxy, alkaneoyl groups of 1–6 carbon atoms, halogen, amino, nitrile, and combinations thereof. Illustrative of this class of compounds are the following:

4,4′ diamino-3-methyldiphenylsulfone,
4,4′ diamino-3-decyldiphenylsulfone,
4,4′ diamino-2-n-butyl-2′-n-hexyldiphenylsulfone,
4,4′ diamino-2-benzyldiphenylsulfone,
4,4′ diamino-3-methoxydiphenylsulfone,
4,4′ diamino-2,2′-diethoxydiphenylsulfone,
4,4′ diamino-3-phenoxydiphenylsulfone,
4,4′ diamino-2-acetyldiphenylsulfone,
4,4′ diamino-3,3′-dicarboethoxydiphenylsulfone,
4,4′ diamino-2-chlorodiphenylsulfone,
4,4′ diamino-2-fluorodiphenylsulfone,
4,4′ diamino-2,3′-dichlorodiphenylsulfone,
2,4,4′ triaminodiphenylsulfone,
4,4′ diamino-3-cyanodiphenylsulfone, and
4,4′ diamino-2-methyl-2′-chlorodiphenylsulfone.

Other combinations of substituent groups within the above formula may be determined by those skilled in the science of chemistry. Among the above named sulfones, paraaminophenylsulfone is preferred. This compound has been incorporated into polyoxymethylene resin and extruded or injection molded to various kinds of shaped articles, for example, pipe, hardware, such as door knobs, hinges, etc. telephone handsets, cologne bottles, and many other items, all of which have excellent odor stability.

The amount of odor suppressor which may be employed is usually less than 10% by weight of the polyoxymethylene and is preferred to be employed at the level of from 0.1 to 1% by weight of the resin but may be employed in ranges of from 0.01 to 5% by weight of the resin. Loadings exceeding 10% by weight of the polyoxymethylene base resin are also operable. However, it has been determined that loadings above 10% of the odor suppressor have some effect on the physical properties of the polymer, and in most cases, loadings on this order or magnitude are economically undesirable. Most of the sulfones of the above formula impart no color to the base resin which in its unmodified condition is white. In addition to the excellent retention of color in the modified resin, the sulfones of the present invention have no adverse effect on the thermal stability of the resin.

The preferred method for incorporating the sulfones into the polyoxymethylene includes dry or solution blending of the sulfones with the polyoxymethylene followed by milling, melting, or extruding the blended mixture. Other methods may be apparent to those skilled in this type of technology.

The product composition of this invention finds its principal utility in molded objects containing colognes and other types of odorous substances. Thus, any object of polyoxymethylene which is to be in intimate contact with the material that would be adversely affected by the presence of formaldehyde gas would advantageously contain one of the sulfones described above. Such objects for example, are films, sheets, bottles, and various other shaped articles.

I claim:

1. A composition having an outstanding odor stability comprising polyoxymethylene having a number average molecular weight of at least 15,000 and 0.01 to 10% weight of said polyoxymethylene of a sulfone having the formula:

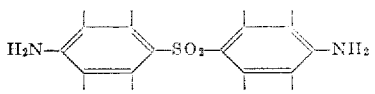

wherein each of the carbon atoms on the 2, 3, 5, and 6 position on each ring structure is bonded to a member of the group selected from the class consisting of hydrogen, alkyl groups of from 1–10 carbon atoms, aryl groups of from 6–10 carbon atoms, alkoxy groups of 1–10 carbon atoms, phenoxy, alkaneoyl groups of from 1–6 carbon atoms, halogen, amino, nitrile, and combinations thereof.

2. A composition of improved odor stability comprising a polyoxymethylene having a number average molecular weight of at least 15,000 and from 0.01 to 5% by weight of said polyoxymethylene of a sulfone having the formula:

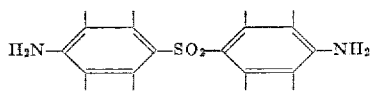

wherein each of the carbon atoms on the 2, 3, 5, and 6 position on each ring structure is bonded to a member of the group selected from the class consisting of hydrogen, alkyl groups of from 1–10 carbon atoms, aryl groups of from 6–10 carbon atoms, alkoxy groups of 1–10 carbon atoms, phenoxy, alkaneoyl groups of from 1–6 carbon atoms, halogen, amino, nitrile, and combinations thereof.

3. The composition of claim 2 wherein said sulfone is present at a concentration of 0.1–1% by weight of said polyoxymethylene.

4. A composition of improved stability comprising a polyoxymethylene having a number average molecular of at least 15,000 and 0.1 to 1% by weight of paraaminophenylsulfone.

5. A film comprising the composition of claim 1.

6. A shaped article comprising the composition of claim 1.

References Cited in the file of this patent
UNITED STATES PATENTS

| | | |
|---|---|---|
| 2,561,948 | Rawlins | July 24, 1951 |
| 2,734,889 | Starr | Feb. 14, 1956 |
| 2,768,994 | MacDonald | Oct. 30, 1956 |

OTHER REFERENCES

Chem. Abstracts, vol. 52, No. 4, Feb. 25, 1958, page 2909g.

UNITED STATES PATENT OFFICE
CERTIFICATE OF CORRECTION

Patent No. 3,102,106                                        August 27, 1963

John Francis Regan

It is hereby certified that error appears in the above numbered patent requiring correction and that the said Letters Patent should read as corrected below.

Column 1, line 64, for "terminal" read -- thermal --; column 3, line 60, for "2,841,57°" read -- 2,841,570 --; column 5, line 1, before "weight" insert -- by --.

Signed and sealed this 3rd day of March 1964.

(SEAL)
Attest:
ERNEST W. SWIDER

EDWIN L. REYNOLDS

Attesting Officer                                Acting Commissioner of Patents